United States Patent
Kashyap et al.

(10) Patent No.: US 9,348,707 B2
(45) Date of Patent: May 24, 2016

(54) DYNAMICALLY ADJUSTING THE NUMBER OF REPLICAS OF A FILE ACCORDING TO THE PROBABILITY THAT THE FILE WILL BE ACCESSED WITHIN A DISTRIBUTED FILE SYSTEM

(71) Applicant: INTERNATIONAL BUSINESS MACHINES CORPORATION, Armonk, NY (US)

(72) Inventors: Sujatha Kashyap, Austin, TX (US); Lisa B. Maurice, Austin, TX (US); Joseph H. Robichaux, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 14/132,289

(22) Filed: Dec. 18, 2013

(65) Prior Publication Data
US 2015/0169612 A1  Jun. 18, 2015

(51) Int. Cl.
*G06F 17/30* (2006.01)
*G06F 11/14* (2006.01)
*G06F 3/06* (2006.01)

(52) U.S. Cl.
CPC ............. *G06F 11/1492* (2013.01); *G06F 3/06* (2013.01); *G06F 17/30082* (2013.01); *G06F 17/30212* (2013.01)

(58) Field of Classification Search
CPC ................. G06F 17/30575; G06F 11/1435
USPC ....................................................... 707/610
See application file for complete search history.

(56) References Cited

U.S. PATENT DOCUMENTS

| 8,307,036 B2 | 11/2012 | Kamat et al. | |
|---|---|---|---|
| 2004/0111390 A1* | 6/2004 | Saito | G06F 11/1435 707/999.001 |
| 2005/0154697 A1* | 7/2005 | Altaf | G06F 17/30575 707/999.001 |

(Continued)

FOREIGN PATENT DOCUMENTS

| CN | 102130950 | 7/2011 |
|---|---|---|
| CN | 101996250 B | 7/2012 |

(Continued)

OTHER PUBLICATIONS

U.S. Appl. No. 14/723,797, filed May 28, 2015, In Re Kashyap, 47 pages.

(Continued)

*Primary Examiner* — Yuk Ting Choi
(74) *Attorney, Agent, or Firm* — Steven L. Bennett; Amy J. Pattillo

(57) ABSTRACT

In a distributed file system with a number of replicas of a file set to two or more replicas, a computer sets a timer to track a time since a last access to the file, wherein the replicas of the file are distributed across two or more nodes within the distributed file system. Responsive to an access to the file prior to the timer reaching a first timer window threshold, the computer resets the timer. Responsive to the timer matching a first timer window threshold, the computer automatically reduces a number of replicas of the file within the distributed file system, wherein the probability that the file will be accessed prior to the first timer window threshold is greater than the probability that the file will be accessed after the first timer window threshold.

13 Claims, 9 Drawing Sheets

(56) References Cited

U.S. PATENT DOCUMENTS

2008/0222154 A1* 9/2008 Harrington ....... G06F 17/30206
 707/999.01
2010/0153337 A1* 6/2010 Murata ............. G06F 17/30575
 707/610

FOREIGN PATENT DOCUMENTS

CN 102571959 7/2012
WO 03012699 A1 2/2003

OTHER PUBLICATIONS

Chen et al., Interactive Analytical Processing in Big Data Systems: A Cross-Industry Study of MapReduce Workloads, pp. 1802-1813, Proceedings of the VLDB Endowment, vol. 5, No. 12, 2012, accessed via the internet from http://vldb.org/pvldb/vol5/p1802_yanpeichen_vldb2012.pdf, 12 pages.

HDFS Architecture Guide, published Aug. 4, 2013, accessed via the internet from http://Hadoop.apache.org as of Oct. 5, 2013, 8 pages.

IBM, What is the Hadoop Distributed File System (HDFS)?, accessed via the internet from http://www-01.ibm.com/software/data/infosphere/hadoop/hdfs/ as of Oct. 5, 2013, 2 pages.

Evans, Jared Matthew, "Fault Tolerance in Hadoop for Work Migration", CSCI B534 Survey Paper, Mar. 28, 2011, accessed via the internet from http://salsahpc.indiana.edu/b534projects/sites/default/files/public/0_Fault%20Tolerance%20in%20Hadoop%20for%-20Work%20Migration_Evans,%20Jared%20Matthew.pdf as of Oct. 5, 2013, 5 pages.

Dekel, "Scalability of the Hadoop Distributed File System", May 5, 2010, accessed via the internet from http://developer.yahoo.com/blogs/hadoop/scalability-hadoop-distributed-file-system-452.html as of Oct. 5, 2013, 7 pages.

Schvachko et al, "The Hadoop Distributed File System", 2010, IEEE, Sunnyvale, California, 10 pages.

IBM, "How can I rebalance by HDFS data?", accessed via the internet from http://www-01.ibm.com/support/docview.wss?uid=swg21578484 as of Oct. 5, 2013, 2 pages.

Grokbase, "Dynamically adjusting replication factor for a data block", Nov. 14, 2009, accessed via the internet from http://grokbase.com/t/hadoop/common-dev/09bf4gtn0r/dynamically-adjusting-replication-factor-for-a-data-block as of Oct. 7, 2013, 2 pages.

Apache Cassandra 1.0 Documentation, "About Replication in Cassandra", Datastax, accessed via the internet from http://www.datastax.com/docs/1.0/cluster_architecture/replicationa as of Oct. 7, 2013, 4 pages.

Kulkarni et al, "Redundancy Elimination Within Large Collections of Files", IBM T.J. Watson Research Center, 2004 Usenix Annual Technical Conference, Boston, MA, Jun. 2004, 14 pages.

* cited by examiner

DYNAMICALLY ADJUSTING THE NUMBER OF REPLICAS OF A FILE ACCORDING TO THE PROBABILITY THAT THE FILE WILL BE ACCESSED WITHIN A DISTRIBUTED FILE SYSTEM

BACKGROUND

1. Technical Field

This invention relates in general to managing a distributed file system and more particularly to dynamically adjusting the number of replicas of a file within a distributed file system according to the probability that the file will be accessed within the distributed file system.

2. Description of the Related Art

As the use of the Internet has grown, the amount of data being accessed via the Internet has also increased. With the increase in the amount of data being accessed, data storage systems have been modified to accommodate larger sets of data and to provide fast and reliable access to the data.

One type of data storage system that is implemented for accommodating larger sets of data and providing fast and reliable access to the data is a distributed file system that stores redundant copies of a file among multiple storage units, which are then accessed as a single file system. By storing redundant copies of a file among multiple storage units, the single file system may respond quickly and reliable to multiple access requests to the files stored within the distributed file system. One type of distributed file system includes a Hadoop Distributed File System (HDFS). Hadoop refers to an open-source software framework developed by the Apache Software Foundation for storage and large scale processing of data-sets on clusters of commodity hardware, where an HDFS achieves reliability, including high availability and fault tolerance, by replicating the files across multiple hosts. Commodity hardware includes computing components that are already available and when implemented within an HDFS, provides low-performance, low-cost hardware working in parallel to support fast and reliable access to data stored on the hardware.

BRIEF SUMMARY

The amount of data being stored in HDFS clusters, and the cost of storing the data, is growing exponentially. The default setting in an HDFS cluster for replicas of each file is three, which also increases the amount of data being stored in HDFS clusters for each stored file and the cost of storing each file within an HDFS. In view of the foregoing, there is a need for a method, system, and computer program product for dynamically adjusting the number of replicas of a file according to the probability that the file will be accessed within the distributed file system.

In another embodiment, a system for dynamically managing a number of replicas of a file in a distributed file system comprises one or more processors and a memory coupled to at least one of the processors. The system comprises a set of computer program instructions stored in the memory and executed by at least one of the processors in order to perform actions of, in a distributed file system with a number of replicas of a file set to two or more replicas, setting a timer to track a time since a last access to the file, wherein the replicas of the file are distributed across two or more nodes within the distributed file system, responsive to an access to the file prior to the timer reaching a first timer window threshold, resetting the timer, and responsive to the timer matching a first timer window threshold, automatically reducing a number of replicas of the file within the distributed file system, wherein the probability that the file will be accessed prior to the first timer window threshold is greater than the probability that the file will be accessed after the first timer window threshold.

In another embodiment, a computer program product for dynamically managing a number of replicas of a file in a distributed file system comprises a computer readable storage medium having program code embodied therewith. The program code is executable by a computer system, in a distributed file system with a number of replicas of a file set to two or more replicas, to set, by the computer system, a timer to track a time since a last access to the file, wherein the replicas of the file are distributed across two or more nodes within the distributed file system. The program code is executable by a computer system, responsive to an access to the file prior to the timer reaching a first timer window threshold, to reset, by the computer system, the timer. The program code is executable by a computer system, responsive to the timer matching a first timer window threshold, to automatically reduce, by the computer system, a number of replicas of the file within the distributed file system, wherein the probability that the file will be accessed prior to the first timer window threshold is greater than the probability that the file will be accessed after the first timer window threshold.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

As described herein, embodiments of the invention provide a solution for identifying and destroying misappropriated, and potentially misappropriated, access tokens.

Figure 1:
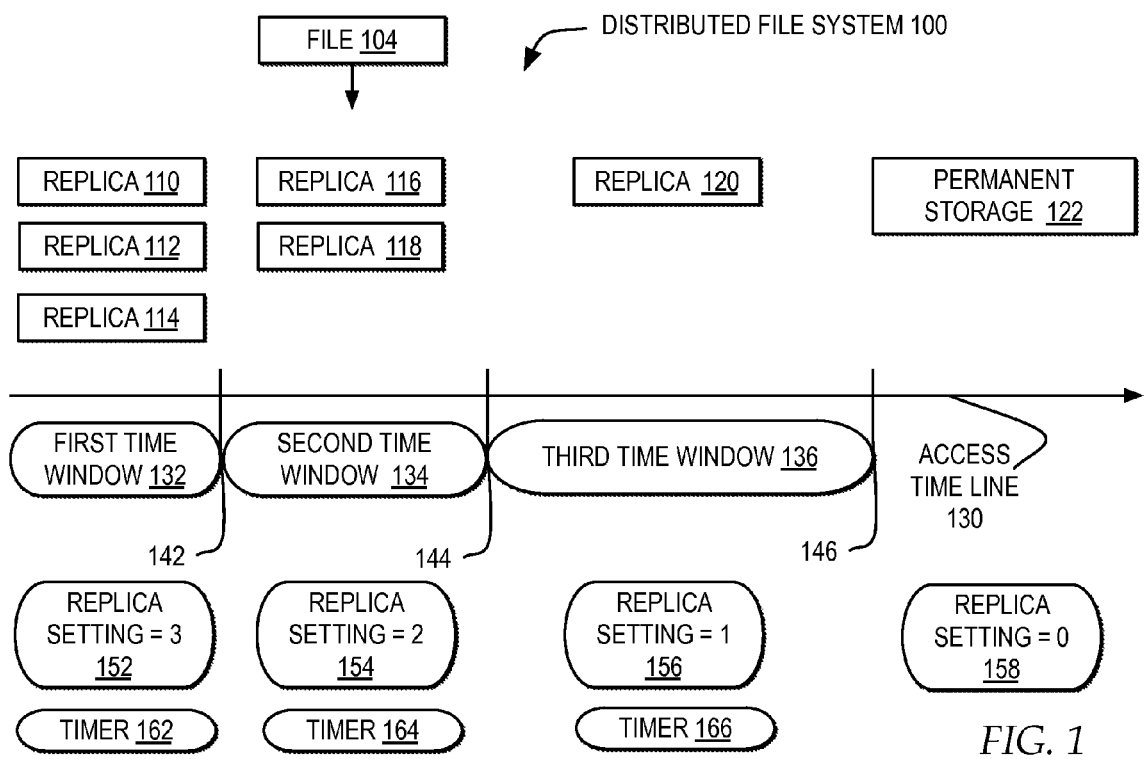
FIG. 1 is a block diagram illustrating one example of a distributed file system in which the number of replicas of a file in the distributed file system is dynamically adjusted as according to the probability that the file will be accessed within the distributed file system.

With reference now to the figures, and in particular with reference now to FIG. 1, a block diagram illustrates one example of a distributed file system in which the number of replicas of a file in the distributed file system is dynamically adjusted as according to the probability that the file will be accessed within the distributed file system.

In the example, a distributed file system 100 includes a file 104. File 104 is redundantly stored with distributed file system 100 to support reliability, fault-tolerance, and accessibility through replicas of file 104 stored within distributed file system 100. For example, in a distributed file system 100, the default number of replicas may be set to three replicas of a file. For purpose of illustration, three replicas of file 104 may be initially stored across multiple racks, as illustrated by replica 110, replica 112, and replica 114. In the example, file 104 may be stored as divided into multiple blocks, with each block replicated across one or more nodes within distributed file system 100.

In the example, once a file is created in distributed file system 100, there may be detectable patterns to client accesses to files over a time period within distributed file system 100. For example, there may access patterns indicating the percentage of files that, once created, are also accessed from distributed file system 100. Among the files that are accessed from distributed file system 100, there may be patterns of a first time window within which a majority of the accesses occur, a second time window within which a next percentage of the accesses occur, and a third time window, after which, it is unlikely that an access will occur. In particular, for files stored within distributed file system 100, access patterns measured over a time period may indicate that files that are most recently created are of most interest to other jobs, and that once files are initially accessed after creation, the files are rarely accessed again, however if an access to a file is a write access, the probability that the file may be accessed again may increase. In view of the detectable access patterns to files within distributed file system 100, as the probability that a file will be accessed decreases, the number of replicas of the file may be decreased, however, as the probability that a data file will be accessed increases, the number of replicas of the file may also be increased.

Based on the detectable access patterns to files within distributed file system 100 and the default number of replicas set to three, along an access time line 130 for file 104, a timer window threshold 142 may be set, which specifies a first time window 132, a timer window threshold 144 may be set, which specifies a second time window 134, and a timer window threshold 146 may be set, which specifies a third time window 136, where each time window also corresponds to a number of replicas designated in a replica setting for a file. In one example, timer window threshold 142, timer window threshold 144, and timer window threshold 146 may be set so that the length of time within each first time window 132, second time window 134, and third time window 136 is the same amount of time or different amounts of time. In another example, timer window threshold 142 may be set to a time representative of a first time by which it is likely that a first percentage of accesses will occur, such as a time by which it is likely that 75% of accesses will occur, timer window threshold 144 may be set to a second time by which it is likely that a second percentage of accesses will occur, such as a time by which it is likely that 85% of accesses will occur, and timer window threshold 146 may be set to a third time by which it is likely that a third percentage of accesses will occur, such as a time by which it is likely that 98% of accesses will occur. In addition, other factors may be used to set each of timer window threshold 142, timer window threshold 144, and timer window threshold 146, including, but not limited to, block sizes, performance parameters, access requirements, fault requirements, and costs associated with reducing a number of replicas of a file. In additional or alternate embodiments, additional or alternate numbers of replicas may be supported, additional or alternate numbers of time windows and timer window thresholds may be supported, and the number of replicas may be different from the number of timer window thresholds.

In the example, during first time window 132, a replica setting for a file is set to "3", as illustrated at reference numeral 152, and three replicas of file 104 are maintained within distributed file system 100, as illustrated by replica 110, replica 112, and replica 114. In one example, a timer 162 may be set that counts time during first time window 132. In the example, if the count in timer 162 reaches timer window threshold 142, a replica setting for file 104 is reduced from "3" to "2", as illustrated at reference numeral 154, a number of replicas of file 104 are reduced to two replicas, illustrated by replica 116 and replica 118, and a timer 164 is set that counts time during second time window 134. In the example, if the count in timer 164 reaches timer window threshold 144, a replica setting for file 104 is reduced from "2" to "1", as illustrated at reference numeral 156, a number of replicas of file 104 is reduced to one replica, as illustrated by replica 120, and a timer 166 is set that counts time during third time window 136. In the example, if the count in timer 166 reaches timer window threshold 146, a replica setting for file 104 is reduced from "1" to "0", as illustrated at reference numeral 158, the remaining replica of file 104 may be removed from distributed file system 100, and file 104 may be archived to permanent storage 122. In one example, permanent storage 122 may represent low-cost tape storage or other remote storage that allows for storage of file 104 in a location where, because the probability of access is very low, access to the file within permanent storage 122 may be slower than the access to the file when stored as a replica. In one example, file 104 may be placed in permanent storage 122 by placing file 104 in a directory of entries that are periodically flushed from storage as replicas to storage in permanent storage 122.

In the example, distributed file system 100 may apply one or more policies for resetting a current timer, resetting a time window setting, and resetting the number of replicas of file 104, in response to an access to file 104. In the example, a policy may specify that in response to any access to file 104, while the time window being counted is first time window 132 and timer 162 is counting, timer 162 is reset, such that timer 162 reflects the amount of time since a last access, whether a read or write, to file 104, to reflect the access pattern that read and write accesses to file 104 are most probable during first time window 132. In the example, a policy may specify that in response to a write access to file 104 while the time window being counted is either second time window 134 or third time window 136, the time window being counted is reset to first time window 132, the timer counting is reset to timer 162, and the replica setting is reset to "3" as illustrated at reference numeral 152, to reflect that the access pattern that following a write access to file 104 the probability increases that file 104 will be accessed again. In the example, a policy may specify that in response to a read access to file 104 while the time window being counted is second time window 134, timer 164 is reset, but the number of replicas is not adjusted, to reflect the access pattern that a read access during second time window 134 does not significantly increase the probability of additional accesses to file 104. In the example, a policy may specify that in response to a read access to file 104 during third time window 136, the time window being counted is reset to second time window 134, the timer counting is reset to timer 164, and the replica setting is reset to "2" as illustrated at reference numeral 154, to reflect a policy to avoid pushing file 104 to permanent storage 122 while there is still a probability of access activity.

While in the example illustrated in FIG. 1, the initial number of replicas set for a file is set to "3", in examples where the number of replicas initially set for a file is set to "2" or "1", after the file is added to distributed file system 100, the number of replicas for the file may still be increased or decreased in response to accesses or lack of accesses based on the policies illustrated in FIG. 1. In an example where the number of replicas set for a file is initially set to a number greater than "3", additional time windows, timer window thresholds, and timers, may be implemented, to manage reduction of the additional replicas using policies similar to the policies implemented for a default setting of three replicas.

In the example, by applying a policy that adjusts the number of replicas of a file based on the probability that the file will be accessed again, the policy used to determine the number of replicas of a file to maintain and to determine whether to move a file into permanent storage 122 is not merely a policy based on which file was least recently used, but is a policy that determines the probability that the file will be accessed again based on the type of access, the time window during which the last access occurred, and other factors. In addition, the policy that is implemented in the example in FIG. 1 includes timer window thresholds that are set so that the highest number of files replicas is maintained for as long as necessary to accommodate the majority of predicted access to files, and the other thresholds are similarly set to optimize the replica adjustments.

Figure 2:
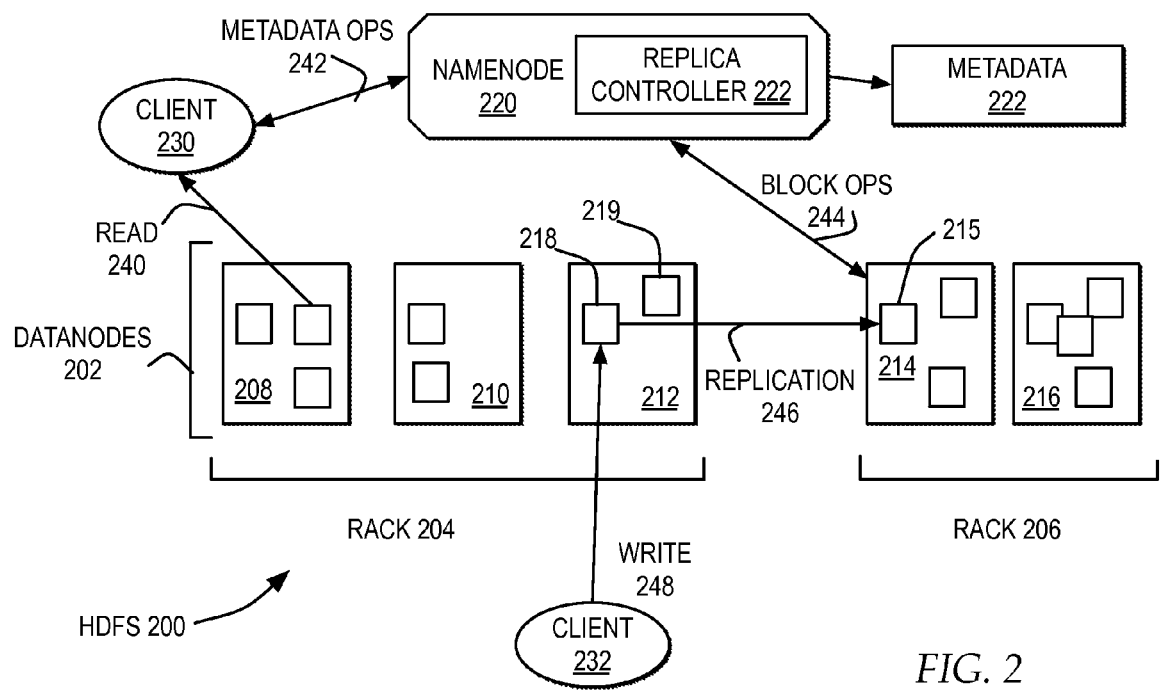
FIG. 2 is a block diagram illustrating one example of a distributed file system with a replica setting controller implemented through a Hadoop distributed file system (HDFS) architecture.

FIG. 2 illustrates a blocked diagram of one example of a distributed file system with a replica setting controller implemented through a Hadoop distributed file system (HDFS) architecture.

In one example, an HDFS 200 is implemented through a master/slave architecture in a cluster environment. HDFS 200 may include a namenode 220, which functions as a master server to manage the file system namespace and regulates access to files by clients, such as a client 230 and a client 232. In one example, namenode 220 exposes the file system namespace and allows clients to submit data to be stored in files within datanodes 202. HDFS 200 may include datanodes 202, such as datanode 208, datanode 210, datanode 212, datanode 214, and datanode 216, which function as slaves. In one example, HDFS 200 supports a traditional hierarchical file organization and a client may create directories managed by namenode 220 within datanodes 202 and store files within these directories. In addition, within the file system namespace hierarchy, a user or application, as a client, may create and remove files from HDFS 200, move a file from one directory to another, or rename a file. Namenode 220 may periodically send heartbeats to each datanode to verify the operating status of each datanode, and if a datanode does not respond, manage movement and replication of file blocks in view of the failed datanode.

In one example, namenode 220 maintains an FsImage file with an image of the entire file system, including the mapping of blocks to files and file system properties, and a transaction log, with entries for each file creation, access, or change within the file system namespace or file system properties, stored as metadata 222. Metadata 222 may be stored in memory and one or more additional storage locations. In one example, namenode 220 may maintain the FsImage file in memory. In one example, namenode 220 may specify a file within its local host OS file system to store the transaction log.

In one example, namenode 220 and datanodes 202 represent software designed to run on commodity machines in a cluster environment. For example, namenode 220 may represent software designed to run on a server. In one example, a machine dedicated as the master runs only the namenode software to implement namenode 220. For example, each of the datanodes described as datanodes 202 may run separate instances of datanode software designed run on nodes within a cluster of nodes. In one example, a single instance of datanode software runs on a node within a cluster. In another example, a node within a cluster may support multiple instances of datanode software.

In one example, a commodity machine for hosting one or more nodes in a cluster environment represents a machine available within a cluster environment, also referred to as a node. In one example, a commodity machine represents a machine available within a cluster environment that runs a multitasking, multi-user based operating system (OS), such as Unix, Linux, or GNU. In one example, each of namenode 220 and datanodes 202 are specified in the Java language such that any machine with an operating layer that supports Java can run namenode 220 and databases 202. Applications, running as a client within HDFS 200, may use one or more types of interfaces to interface with namenode 220 and datanodes 202, including, but not limited to, a Java API, a C language wrapper for a Java API, and an HTTP browser. In one example, all HDFS communication protocols implemented within HDFS 200 between components are layered within one or more layers on top a lower level network layer through which network connections are established between machines within HDFS 200, such as on top of the TCP/IP protocol layer.

In one example, the physical infrastructure of commodity machines for hosting one or more nodes within a cluster may include one or more racks of nodes, such as rack 204 and rack 206, where each rack represents a grouping of server systems with consolidated network resources and components. In one example, each of rack 204 and rack 206 represent a framework called a rack, into which multiple servers are installed, which share consolidated networks resources and components and may include additional infrastructure for managing cooling systems, power management systems, and other server system management functions for optimizing the management of a group of servers. In the example, communications between nodes within a rack may be optimized over the consolidated network resources and components. In contrast, communications between a node within rack 204 and a node within rack 206 may be required to pass over one or more switches or other network infrastructure connecting rack 204 to rack 206, which may require more network bandwidth and resources than intra-node communications within a particular rack.

Namenode 220 may execute file system namespace operations including, but not limited to, opening, closing, and renaming files and directories stored within datanodes 202. Namenode 220 may also determine the mapping of blocks to datanodes 202 and may communicate the mapping of blocks in datanodes 202 to clients via metadata ops 242. In particular, within HDFS 200, when a file is stored within datanodes 202, the file may be split into one or more blocks, and these blocks are stored in a set of datanodes mapped by namenode 220 from among datanodes 202, such as a block 218 and a block 219 stored in datanode 212. In one example, all the blocks for a file, except for the last block, may be the same size. In the example, datanodes 202 respond to read and write requests, such as read request 240 from client 230 and write requests 248 from client 232. In addition, datanodes 202 may perform block creation, deletion, and replication in response to block ops 244 from namenode 220.

In one example, for a client, such as client 232, to add a file to HDFS 200, client 232 sends a request to namenode 220 to create a file in HDFS 200 by sending the file path to namenode 220. For each block of the identified file, namenode 220 may search metadata 222 to select datanodes from among datanodes 202 to host the replicas of the file and return a list of selected datanodes to client 232. Client 232 then pipelines the data for the file to the selected datanodes in the list of datanodes through write requests, such as write request 248. In particular, within HDFS 200, client 232 may send write request 248, including the list of selected datanodes received form namenode 220, to datanode 212. As datanode 212 receives packets for storage as block 218 in datanode 212, datanode 212 may also manage replication of the packets to a next datanode in the list of selected datanodes, for example, as illustrated by replication 246 to a block 215 within datanode 214. In the example, datanodes 202 may manage storage of the data and confirm the creation of the block replicas to namenode 220, as illustrated by block ops between datanodes 202 and namenode 220.

Within HDFS 200, in addition to dividing a large file into multiple blocks and storing the blocks across one or more datanodes 202, HDFS 200 also manages replication of each block within datanodes 202 to provide reliability and accessibility. In one example, the client creating a file may specify the initial number of replicas for a file or namenode 220 may set a default number of replicas for a file stored within HDFS 200. The replica setting for a file may be changed after the file is created. In one example, files managed in HDFS 200 may be managed as write-once, with strictly one writer at any time. In the example, after a file is created within HDFS 200 one or more of the writer of a file and a replication controller 222 may adjust the number of replicas in the replica setting for a file. The number of replicas specified for a file may be referred to as the replication setting, replication factor, replica setting, or other replication indicator for the file.

In the example, a replica controller 222 of namenode 220 may optimize both the placement of replicas within datanodes 202 according to the replica setting for a file and, once a file is initially created and replicated, replica controller 222 may control the dynamic adjustment of the number of replicas in a replica setting for a file according to the probability that the file will be accessed. In addition, replica controller 222 may control replication of a file in the event that a datanode fails or is removed and a replica needs to be replaced to meet the replica setting for a file. In one example, through monitoring for heartbeat messages from datanodes 202, replica controller 222 of namenode 220 may constantly track which blocks need to be replicated because of datanode failures and initiate replication within one or more datanodes whenever necessary.

In one example, replica controller 222 may implement one or more policies in determining where to place replicas within datanodes 202 in order to manage data reliability, data availability, and network bandwidth utilization through the placement of replicas. In particular, in one example, the underlying network infrastructure of the nodes on which datanodes 202 run may impact the policy implemented to place replicas through datanodes 202. In one example, each of rack 204 and rack 206 represent clusters of nodes, where communications between nodes in rack 204 and nodes in rack 206 move through switches. In general, the network bandwidth between nodes within a same rack is greater than the network bandwidth between nodes in different racks and in general. Namenode 220 is aware of the network infrastructure of the nodes underlying datanodes 202, such as being aware of which datanodes operate on a same rack.

In one example, a policy for replica placement implemented by replica controller 222 may distribute each replica of a block of a file onto a datanode within a different rack. In another example, a policy for replica placement implemented by replica controller 222, for an example where the replica setting is three, may place one replica on one node in a rack that is closest, or local, and the other two replicas on nodes in a remote rack. In another example, to minimize global bandwidth consumption and read latency, namenode 220 may attempt to satisfy a read request by a client from a replica that, in view of the underlying network infrastructure, is closest to the client reader, such that distribution of replicas throughout the datanodes may be optimized when distributing replicas between local and remote racks. Additional policies may be implemented by replica controller 222 according to performance requirements for data reliability, data availability, and network bandwidth utilization within HDFS 200.

In one example, replica controller 222 may implement one or more policies in determining whether to adjust the number of replicas of a file based on the probability that the file will be accessed. In one example, as illustrated with reference to FIG. 1, replica controller 222 may implement a policy that requires tracking accesses of a file across multiple time window thresholds, where tracking the accesses of a file across multiple time window thresholds requires resetting a timer for each access to a file, reducing the number of replicas of a file as the tracked time reaches each threshold, and finally moving the file to low-cost, permanent storage after the final threshold is reached. In one example, time window thresholds may be spaced apart a same amount of time or the time window thresholds may be spaced out different amounts of time.

In one example, a system administrator may set the time window thresholds for managing replicas within HDFS 200 or a client may set the time window thresholds for a specific file within HDFS 200. In addition, replica controller 222 may monitor the pattern of user accesses within HDFS 200 over a period of time and reset timer window thresholds according to policies set for setting each timer window threshold based on patterns of user access. For example, replica controller 222 may optimize the timer window thresholds set for managing replicas within HDFS 200 such that a first timer window threshold represents an amount of time during which a large percentage of accesses to a file occur within HDFS 200, such that if a timer reaches the first timer window threshold, the probability that the file will be accessed is reduced and the replica setting for the file can be reduced with minimal impact to availability. Replica controller 222 may optimize the second timer window threshold for a next percentage of accesses to file, such that if a timer reaches the second timer window threshold, the probability that the file will be accessed is minimal and the replica setting for the file can be reduced again with a preference for reducing the number of replicas of the file overriding the redundancy and availability. Replica controller 222 may optimize additional timer window thresholds for triggering replica reductions, until a number of replicas reaches zero, such that by the time the number of replicas is reduced to zero, the probability of access is so minimal that the file can be moved to low-cost, permanent storage, rather than maintaining replicas of the file in faster, more accessible storage.

In the example, in addition to reducing the number of replicas, replica controller 222 may also increase the number of replicas based on the type of access or other factors. For example, replica controller 222 may apply a policy that if a write access occurs at any time, the replica setting for the file is set to the default number of replicas and the timer resets to count to the first timer window threshold or a policy that if a read access occurs before the third timer window threshold is reached, then the replica setting is incremented for the file and the timer reset to count to the second timer window threshold. In the example, the lengths of time set for the timer window thresholds tracked by replication controller 222 for a file may be further specified based on the block size set for the blocks of a file, wherein for files with larger block sizes, a policy may favor setting timer window thresholds that are short, to move larger blocks of data out of distributed file system 200 more quickly, in comparison with a policy set for smaller block sizes, which may favor setting timer window thresholds that are longer, to allow longer maintenance of smaller blocks of data within distributed file system 200.

In the example, replica controller 222 may also further specify the replica placement policy to optimize the placement of replicas for one or more blocks of a file as the number of replicas are dynamically increased or decreased by replica controller 222. For example, replica controller 222 may further specify a replica placement policy that first reduces the replica in a node that is most remote in the physical infrastructure and then reduces a replica in a node that is most local in the physical infrastructure. Replica controller 222 may further specify a replica placement policy that, upon a dynamic increase of the number of replicas, increases the number of replicas in a local node first. In particular, when the replication setting for a file is dynamically increased by replica controller 222, namenode 220 may apply a replica placement policy to optimize the selection of a datanode to receive the replica and with the next heartbeat to one of the datanodes with an existing replica of the block, namenode 220 transfers the instruction to replicate the existing replica of the block at the selected datanode. In particular, when the replication setting for a file is dynamically decreased by replica controller 222, namenode 220 may apply a replica placement policy to optimize the selection of a datanode with an existing replica that can be deleted, and with a next heartbeat, namenode 220 transfers the request to delete the replica from the selected datanode. The datanodes receive the heartbeat with the delete instruction for a selected datanode and the selected datanode may remove the corresponding blocks of a file to free up space within the cluster.

In the example, replica controller 222 may manage the number of replicas of a file on a file by file basis and may also manage the number of replicas of each block of a file and the placement of the blocks on a block by block basis. In one example, a user may specify the replica setting for a file by block, where a first selection of the blocks of a file may be set to higher replica setting than a second selection of the blocks. Replica controller 222 may apply one or more policies for managing adjustments to the number of replicas of the blocks of a file when not all the replica settings for blocks in the file are the same. In one example, replica controller 222 may track timers and apply policies based on the greatest replica setting from among all the replica settings for the blocks of a file and apply a policy, when reducing the number of replicas, to either simultaneously reduce the replica setting for all the blocks or to only reduce the replica settings for the selection of blocks with the greatest replica setting.

In the example, replica controller 222 may monitor the pattern of user accesses within HDFS 200 over a period of time and reset timer window thresholds according to policies set for setting each timer window threshold based on patterns of user access, by periodically collecting all the entries in a transaction log within metadata 222 and analyzing the entries to detect user access patterns. In the example, namenode 220 may add an entry to a transaction log within metadata 222 for each access and change that occurs to the file system namespace and to file system metadata including, but not limited to, each new file creation, each read access, each write access, and each change of the replication setting for a file.

Figure 3:
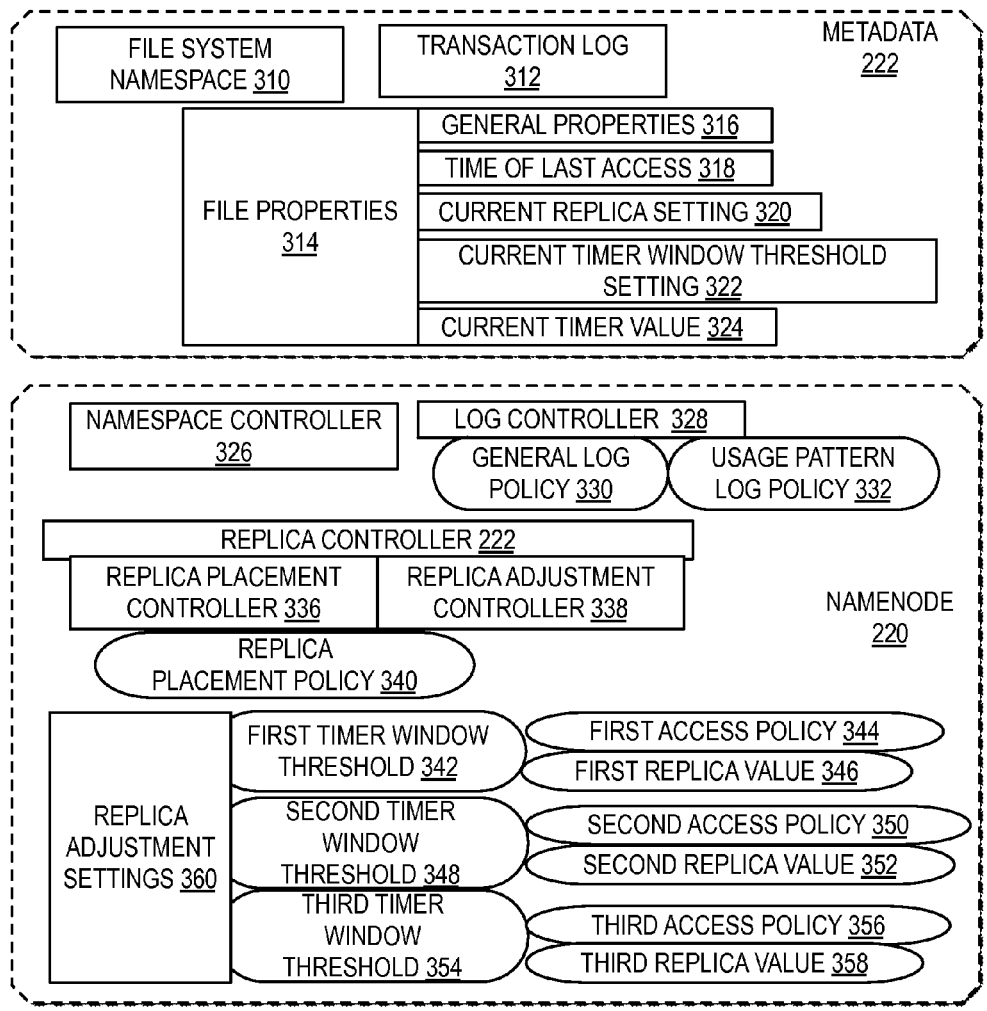
FIG. 3 is a block diagram illustrating one example of components within a namenode and metadata within an HDFS for managing adjustment of the number of replicas of a file within the HDFS according to the probability that the file will be accessed within the HDFS.

FIG. 3 illustrates a block diagram of one example of components within a namenode and metadata within an HDFS for managing adjustment of the number of replicas of a file within the HDFS according to the probability that the file will be accessed within the HDFS.

In one example, for a distributed file system, such as HDFS, to dynamically adjust the number of replicas of a file, multiple components and data elements may be implemented within a central controller for the distributed file system, such as a namenode 220, and within the data maintained about the distributed file system, such as in metadata 222.

In one example, metadata 222 may include a file system namespace 310 identifying the locating information for each system available in the file system namespace and for each file stored in the file system namespace. In one example, namenode 220 may implement a namespace controller 326 that manages the communications between namenode 220 and one or more clients, that manages accesses and changes to file system namespace 310, that manages communications between namenode 220 and datanodes, that manages monitoring of the status of each datanode and responses to any changes to the availability of each datanode, and additional functions related to managing a file system. In one example, namespace controller 326 may maintain one or more file properties 314 with each file stored within file system namespace 310. File properties 314 may include multiple data entries including, but not limited to, general properties 316, a time of a last access 318, a current replica setting 320 specifying a current number of replicas of a file, a current timer window threshold setting 322 specifying the amount of time or specific time, and a current timer value 324 counting a current time since the timer was last reset.

In addition, metadata may include a transaction log 312, in which every change to file system namespace 310, and every change within the distributed file system, may be logged. In one example, namenode 220 may implement a log controller 320 for detecting actions that are required to be logged, according a general log policy 330 and a usage pattern log policy 332, and adding a log entry for each action to transaction log 312. In particular, usage pattern log policy 332 may specify, for actions to be logged according to general log policy 330, additional types of data to be logged in association with the action and may specify additional actions to be logged, along with the types of data to be logged. In particular, usage pattern log policy 332 may be specified to trigger logging of data elements that allow for analysis of usage patterns by a usage pattern analysis controller, such that the usage pattern analysis controller may dynamically adjust one or more settings within replica placement policy 340 or replica adjustment settings 360 according to current usage patterns of files.

In the example, replica controller 222 may include a replica placement controller 336 for controlling the placement of replicas of files among available datanodes according to a replica placement policy 340. In addition, replica controller 222 may include a replica adjustment controller 338 for controlling the adjustment of the replica setting value for a file according to the probability that the file will be accessed within the HDFS as specified by replica adjustment settings 360. In one example, replica placement policy 340 may also include policies that are specified to select replica placements in response to adjustments made by replica adjustment controller in response to replica adjustment settings 360. In the example, replica adjustment settings 360 may include a first timer window threshold 342, for specifying a first timer window threshold to count to for a first time window, a first replica value 346 specifying a value or equation for calculating a value of a number of replicas for a replica setting for a file during a first time window, and a first access policy 344 for responding to accesses or a lack of accesses to a file during the first time window. In the example, replica adjustment settings 360 may include a second timer window threshold 348, for specifying a second timer window threshold to count to for a second time window, a second replica value 352 specifying a value or equation for calculating a value of a number of replicas for a replica setting during a second time window, and a second access policy 350 for responding to accesses or a lack of accesses to a file during the second time window. In the example, replica adjustment settings 360 may include a third timer window threshold 354, for specifying a third timer window threshold to count to for a third time window, a third replica value 358 specifying a value or equation for calculating a value of a number of replicas for a replica setting during a third time window, and a third access policy 356 for responding to accesses or a lack of accesses to a file during the third time window.

In additional or alternate embodiments, metadata 222 may include additional or alternate types of data and data entries. In addition, in additional or alternate embodiments, namenode 220 may include additional or alternate controllers, policies, and settings for managing a distributed file system and, in particular, for managing adjustment of the number of replicas of a file within the HDFS according to the probability that the file will be accessed within the HDFS.

Figure 4:
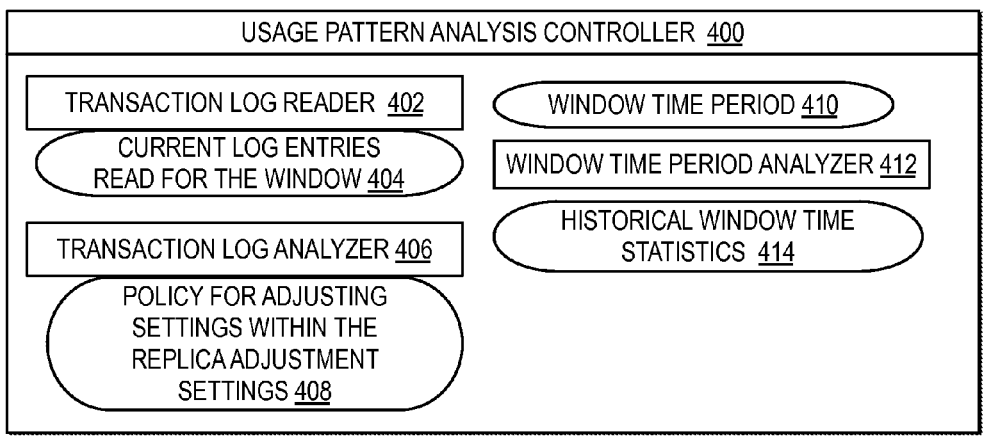
FIG. 4 is a block diagram illustrating one example of a usage pattern analysis controller for analyzing current access patterns within a distributed file system and dynamically adjusting one or more replica adjustment settings.

FIG. 4 illustrates a block diagram of one example of a usage pattern analysis controller for analyzing current access patterns within a distributed file system and dynamically adjusting one or more replica adjustment settings.

In the example, a usage pattern analysis controller 400 includes a transaction log reader 402 for reading entries over a time period specified by window time period 410 from transaction log 302 into a current log entries read for the window file 404. In the example, window time period 410 may be set to a period of time long enough to allow collection of enough log entries to allow for identification of changing trends in access patterns and window time period 410 may specify a point in time to read the entries within transaction log 312. In the example, in addition to window time period 410 specifying a point in time for transaction log reader 402 to read transaction log 312, other actions, such as actions performed by one of the controllers within namenode 220, may trigger transaction log reader 402 to read transaction log 312.

In the example, usage pattern analysis controller 400 may include a transaction log analyzer 406 to analyze current log entries read for the window 404 and apply a policy 408 for adjusting one or more settings within the replica adjustment settings. In the example, policy 408 may include one or more policies for identifying a first threshold of a time by which a first percentage of accesses occur within current log entries read for the window 404 and for setting first timer window threshold 342 to the value of the first threshold. In the example, policy 408 may include one or more policies for identifying a second threshold of a time by which a second percentage of accesses occur within current log entries read for the window 404 and for setting second timer window threshold 348 to the value of the second threshold. In the example, policy 408 may include one or more policies for identifying a third threshold of a time by which a third percentage of accesses occur within current log entries read for the window 404 and for setting third timer window threshold 342 to the value of the third threshold. In the example, policy 408 may also include policies for additional time adjustments to apply to each of first timer window threshold 342, second timer window threshold 348, and third timer window threshold 352 to maintain the times set for each threshold to within one or more ranges to meet service level agreements and other performance requirements. Policy 408 may also include one or more policies for identifying the frequency of replica change settings occurring during each time window and determining whether to change one or more actions set in first access policy 344, second access policy 350, and third access policy 356 to more effectively respond to accesses within each time window. For example, transaction log analyzer 406 may adjust one or more of first access policy 344, second access policy 350 and third access policy 356 according to policy 408 to specify which types of accesses cause adjustments to replica setting 320 and timer window threshold setting 322 and the amount of the adjustment.

In the example, usage pattern analysis controller 400 may include a window time period analyzer 412 to analyze current log entries read for the window 404 and determine whether to adjust window time period 410 to a shorter or longer time period for a next sampling. In addition, window time period analyzer 412 may compare statistics analyzed from current log entries read for the window 404 with historical window time statistics 414 to identify differences in the usage patterns, in order to distinguish between short-term and long-term changes in usage patterns and determine whether to adjust window time period 410 to adjust the sample time period to enable transaction log analyzer 406 to adjust settings within replica adjustment settings 360 to respond to short-term changes in usage patterns.

In the example, usage pattern analysis controller 400 may function as a component of namenode 220 or as a service separate from namenode 220, which reads transaction log 312 from metadata 222. In one example, a system administrator may set one or more of policy 408 and window time period 410. In addition, a service may automatically set one or more of policy 408 and window time period 410 to meet monitoring requirements in service level agreements with users of a distributed file system.

Figure 5:
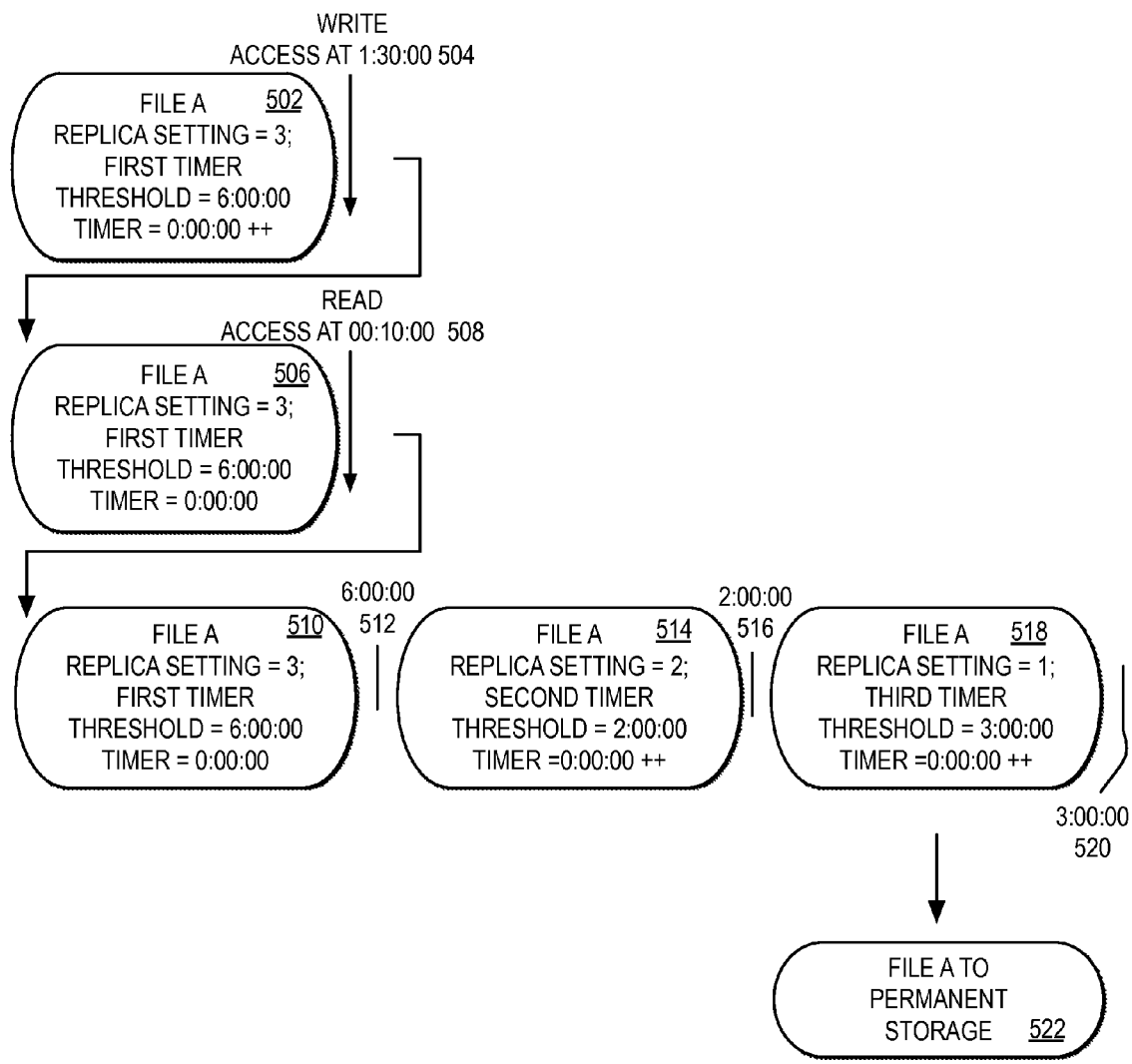
FIG. 5 is a block diagram illustrating one example of a replica controller dynamically adjusting the number of replicas of a file within a distributed file system after no reaccesses to a file are detected after a first time window expires.

FIG. 5 illustrates a block diagram of one example of a replica controller dynamically adjusting the number of replicas of a file within a distributed file system after no reaccesses to a file are detected after a first timer window threshold expires. In the example, as illustrated in a file record at reference numeral 502, a file "A" includes a replica setting of "3", a first timer window threshold set to "6:00:00" and a timer set to start counting. In the example, as illustrated at reference numeral 504, a write access to the file is received when the timer reads "1:30:00". In response to the write access to the file prior to the timer reaching the first timer window threshold, replica controller 222 may automatically reset the timer for the file, as illustrated in a file record at reference numeral 506. Next, in the example, as illustrated at reference numeral 508, a read access to the file is received when the timer reads "00:10:00". In response to the read access to the file prior to the timer reaching the first timer window threshold, replica controller 222 may automatically reset the timer for the file, as illustrated in a file record at reference numeral 510.

Next, in the example, after the read access at "00:10:00: illustrated at reference numeral 508, there are no additional accesses to file "A". As a result, in the example, as illustrated at reference numeral 512, when the timer reaches "6:00:00" and matches the first timer window threshold of "6:00:00", then replica controller 222 may decrease the replica setting value to "2", may set the timer window threshold to the second timer window threshold of "2:00:00", and may reset and start the timer, as illustrated in the file record at reference numeral 514. In the example, as illustrated at reference numeral 516, when the timer reaches "2:00:00" and matches the second timer window threshold of "2:00:00", replica controller 222 may decrease the replica setting value to "1", may set the timer window threshold to the third timer window threshold of "3:00:00" and may reset and start the timer, as illustrated in the file record at reference numeral 518. In the example, as illustrated at reference numeral 520, when the timer reaches "3:00:00" and matches the third timer window threshold of "3:00:00", replica controller 222 may automatically send file "A" to permanent storage, as illustrated at reference numeral 522.

Figure 6:
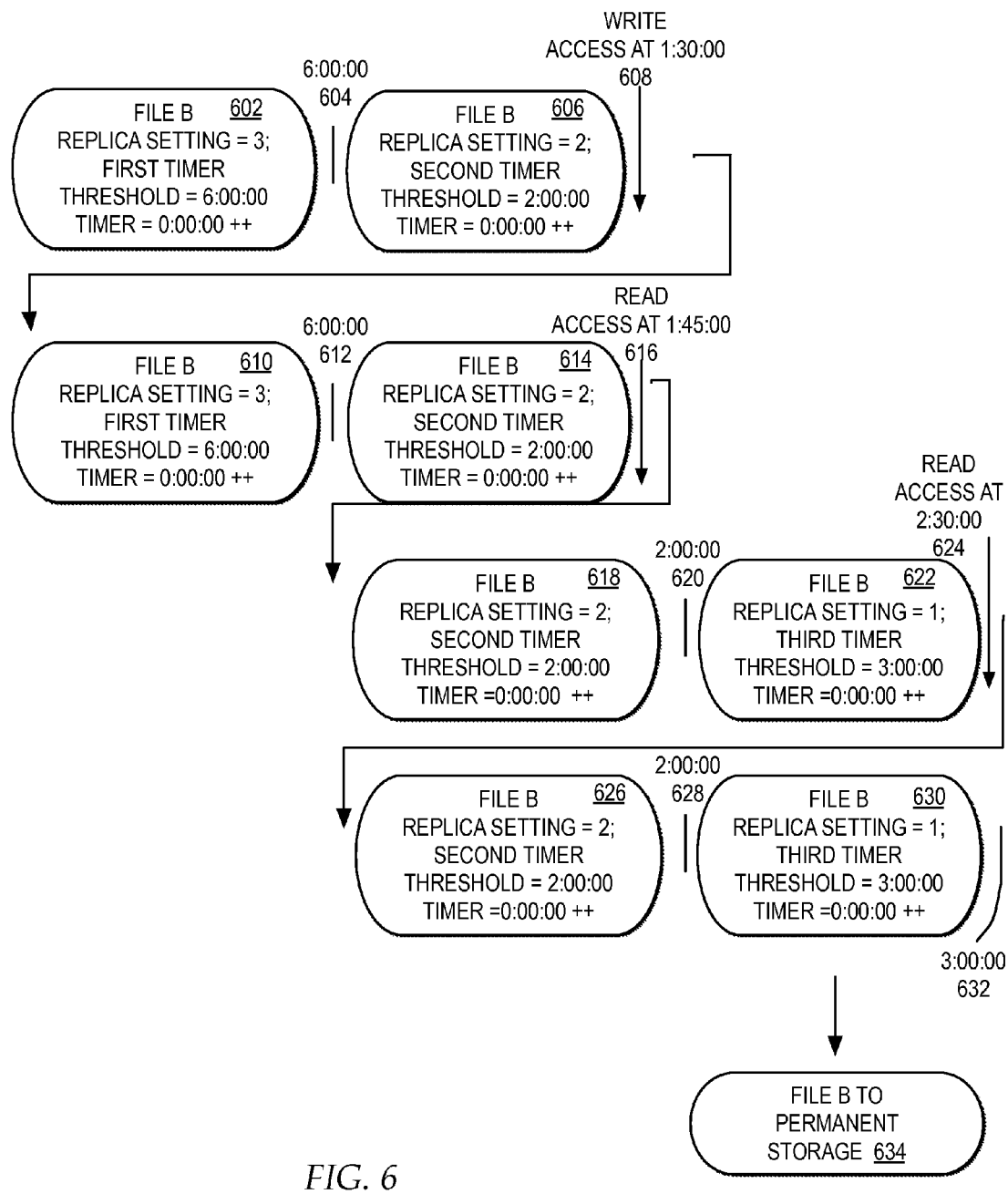
FIG. 6 is a block diagram illustrating one example of a replica controller dynamically adjusting the number of replicas of a file within a distributed file system by increasing and decreasing the number of replicas of the file.

FIG. 6 illustrates a block diagram of one example of a replica controller dynamically adjusting the number of replicas of a file within a distributed file system by increasing and decreasing the number of replicas of the file. In the example, as illustrated in a file record at reference numeral 602, a file "B" includes a replica setting of "3", a first timer window threshold set to "6:00:00" and a timer set to start counting. In the example, as illustrated at reference numeral 604, when the timer reaches "6:00:00" and matches the first timer window threshold of "6:00:00", replica controller 222 may decrease the replica setting value to "2", may set the timer window threshold to the second timer window threshold of "2:00:00", and may reset and start the timer, as illustrated in the file record at reference numeral 606.

In the example, as illustrated at reference numeral 608, a write access to the file is received when the timer reads "1:30:00". In response to the write access to the file, for a policy in which write accesses always reset the file settings, replica controller 222 may automatically reset the replica setting for the file to the default setting, which in the example is "3", may reset the timer window threshold to the first timer window threshold of "6:00:00" and may reset the timer for the file, as illustrated in a file record at reference numeral 610. Next, in the example, as illustrated at reference numeral 612, when the timer reaches "6:00:00" and matches the first timer window threshold of "6:00:00", replica controller 222 may again decrease the replica setting value to "2", may set the timer window threshold to the second timer window threshold of "2:00:00", and may reset and start the timer, as illustrated in the file record at reference numeral 614.

In the example, as illustrated at reference numeral 616, a read access to the file is received when the timer reads "1:45:00". In response to the read access to the file, for a policy in which read accesses during a second time window reset the timer within that time window, replica controller 222 may automatically reset the timer for the file, as illustrated in a file record at reference numeral 618. Next, in the example, as illustrated at reference numeral 620, when the timer reaches "2:00:00" and matches the second timer window threshold of "2:00:00", replica controller 222 may decrease the replica setting value to "1", may set the timer window threshold to the third timer window threshold of "3:00:00" and may reset and start the timer, as illustrated in the file record at reference numeral 624.

In the example, as illustrated at reference numeral 624, a read access to the file is received when the timer reads "2:30:00". In response to the read access to the file, for a policy in which read accesses during a third time window reset the time record to a second time window, replica controller 222 may automatically reset the timer for the file, as illustrated in a file record at reference numeral 618. For example, replica controller 222 may automatically set the time record for the file to the second time window by increasing the replica setting for the file to "2", resetting the timer window threshold to the second timer window threshold of "2:00:00" and resetting the timer for the file, as illustrated in a file record at reference numeral 626.

Next, in the example, as illustrated at reference numeral 628, when the timer reaches "2:00:00" and matches the second timer window threshold of "2:00:00", replica controller 222 may decrease the replica setting value to "1", may set the timer window threshold to the third timer window threshold of "3:00:00" and may reset and start the timer, as illustrated in the file record at reference numeral 630. In the example, as illustrated at reference numeral 632, when the timer reaches "3:00:00" and matches the third timer window threshold of "3:00:00", replica controller 222 may automatically send file "B" to permanent storage, as illustrated at reference numeral 634.

Figure 7:
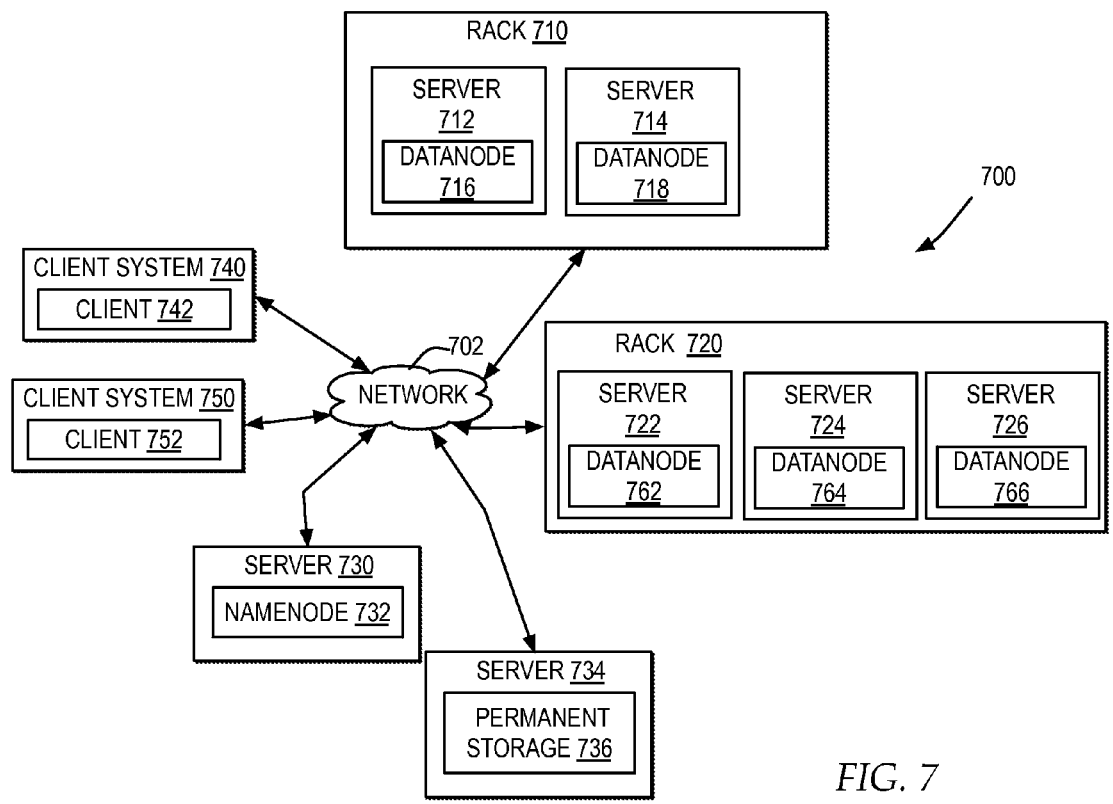
FIG. 7 is a block diagram illustrating one example of a network environment in which a distributed file system may be implemented.

FIG. 7 illustrates a block diagram of one example of a network environment in which a distributed file system may be implemented. One of ordinary skill in the art will appreciate that environment 700 is illustrative of one type of network environment that may support clients, servers and other components through which a distributed file system, such as HDFS 200 in FIG. 2, is implemented. In addition, one of ordinary skill in the art will appreciate that the distribution of systems and the distribution of components within systems within network environment 700 are illustrative of a distribution of systems and components, however, other distributions of systems and components within a network environment may be implemented.

As illustrated, multiple systems within network environment 700 may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony based networks, broadcast television networks, local area and wire area networks, public networks, and restricted networks. Network environment 700 may implement multiple types of network architectures.

Network 702 and the systems communicatively connected within network environment 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the worldwide collection of networks and gateways that use the TCP/IP suite of protocols to communicate with one another. Network 702 may implement a secure HTTP protocol layer or other security protocol for securing communications between systems. Network 702 may implement an encryption protocol layer through which messages, or through which restricted tag elements within a message, are encrypted and decrypted through one or more encryption protocols.

In the example, as illustrated, a client system 740 and a client system 750 are communicatively connected via network 702 to one or more of rack 710, rack 720, server 730 and server 734. In the example, rack 710 represents a physical infrastructure for housing one or more server systems, such as a server 712 and a server 714, where rack 710 may support a combined network infrastructure and components shared by server 712 and server 714, and rack 720 represents a physical infrastructure for housing one or more server systems, such as a server 722, a server 724, and a server 726, where rack 720 may support a combined network infrastructure and components shared by server 722, server 724, and server 726.

Each of rack 710 and rack 720 may represent one or more cluster systems of nodes. In the example, each server system within a cluster system of rack 710 or rack 720 may represent a node within the cluster system. In addition, the server systems within rack 710 or rack 720 may run virtualization layers that enable virtualizing each server system into multiple virtual machines, each operating a separate instance of an operating system and partitioned for data security, where each virtual machine may represent a node. In addition, rack 710 and rack 720 may include additional controllers within the shared network infrastructure, and servers within rack 710 and rack 720 may include additional controllers, that provide interfaces for additional virtualization layers, including, but not limited to, interfaces for supporting access to virtualized network layer.

In one example, each of client system 740, client system 750, server 712, server 714, server 722, server 724, server 726, server 730 and server 734 may represent one or more computer systems, such as computer system 800 of FIG. 8, to be described below. In one example, any of the clients and servers illustrated may represent a same physical device, but different logical devices with different network addresses. In one example, each of client system 740, client system 750, server 712, server 714, server 722, server 724, server 726, server 730 and server 734 may execute one or more interfaces, where each interface is executed as functions of a browser or other network interface application, as plug-ins, as standalone functions, as functions of an operating system layer, or as other executable components of the computer system. In one example, each of client system 740, client system 750, server 712, server 714, server 722, server 724, server 726, server 730 and server 734 may also represent a networked environment including multiple server systems.

In one example, client system 740 and client system 750 each host one or more client components, such as client 742 and client 752, respectively, for enabling a user or application to interface with a distributed file system to request the creation of new entries within the distributed file system, to request to read and write to entries within the distributed file system, and to request to adjust the settings of entries within the distributed file system. For example, client 742 and client 752 may represent clients for interfacing with a distributed file system such as HDFS 200, such as client 230 or client 232 of FIG. 2. In the example, additional or alternate client systems may host client components for interfacing with a distributed file system within network environment 700.

In one example, server 730 may host one or more components of namenode 732, where namenode 732 performs one or more of the functions described with reference to namenode 220. In the example, while namenode 732 is illustrated as a single component of server 730, in other embodiments, multiple instances of namenode 732 may be hosted by a single server or across multiple servers.

Each of server 712, server 714, server 722, server 724, and server 726, may host one or more nodes and each node may host one or more datanodes, such as datanodes 202 in FIG. 2. For purposes of example, in an example where each server within each of rack 710 and rack 720 represents a separate cluster node and each cluster node supports a separate instance of a datanode, server 712 may host a datanode 716, server 714 may host a datanode 718, server 722 may host a datanode 762, server 724 may host a datanode 764, and server 726 may host a datanode 766. In the example, namenode 732 may manage a distributed file system of files across datanode 716, datanode 718, datanode 762, datanode 764, and datanode 766, such as HDFS 200 managed across datanodes 202 in FIG. 2.

In one example, where namenode 732 manages an HDFS, namenode 732 manages the storage of large files, such as files ranging from gigabytes to terabytes, across multiple datanodes. In particular, namenode 732 may provide data reliability across the multiple datanodes by breaking each file into blocks and replicating each block of a file across multiple datanodes, such that if one datanode fails, a replica of the block of the file stored on the failed datanode is available on another datanode. In the example, because namenode 732 manages the replication of a file within the distributed file system across multiple datanodes, the datanodes are not required to run on server hosts that provide redundant array of independent disks (RAID) storage or other redundancy storage by the server itself, shifting redundancy performance requirements off of the underlying server host and allowing for datanodes to run on cluster nodes with minimal redundancy infrastructure.

In one example, server 734 manages permanent storage 122, where permanent storage represents a remote storage location, such as a magnetic tape data storage managed by a tape drive, to which namenode 732 may push a file for storage once the file has aged out of storage within one or more of the datanodes managed by namenode 732. In one example, magnetic tape may represent an inexpensive, high capacity medium optimized for archiving large amounts of data, however, latency times for access to data stored on magnetic tape may be significantly longer than the latency times for access to data stored by servers on rack 710 or rack 720. In other examples, permanent storage 122 may include additional or alternate types of storage that may be less expensive than the storage used for active replicas of a file within a distributed file system.

Figure 8:
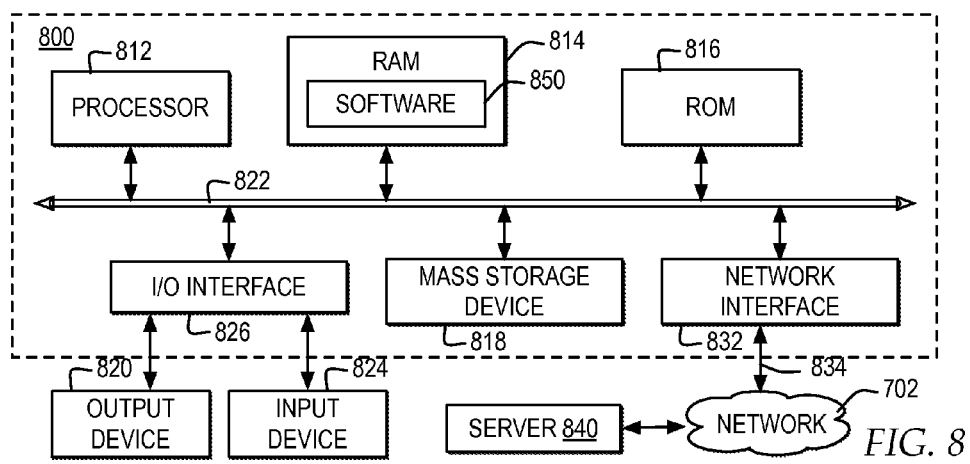
FIG. 8 is a block diagram illustrating one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 702.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 812 may control the operations of flowchart of FIGS. 9-12 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts FIGS. 9-12.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 818, a random access memory (RAM), such as RAM 814, a read-only memory (ROM) 816, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 800, partly on the user's computer, as a stand-alone software package, partly on the user's computer and partly on a remote computer or entirely on the remote computer or server, such as server 840. In the latter scenario, the remote computer may be connected to the user's computer through any type of network, such as network 702, through a communication interface, such as network interface 832, over a network link that may be connected, for example, to network 702.

In the example, network interface 832 includes an adapter 834 for connecting computer system 800 to network 702 through a link and for communicatively connecting computer system 800 to server 840 or other computing systems via network 702. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 800, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 800, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 832, the network link to network 702, and network 702 may use electrical, electromagnetic, or optical signals that carry digital data streams. The signals through the various networks and the signals on network 702, the network link to network 702, and network interface 832 which carry the digital data to and from computer system 800, may be forms of carrier waves transporting the information.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figure 9:
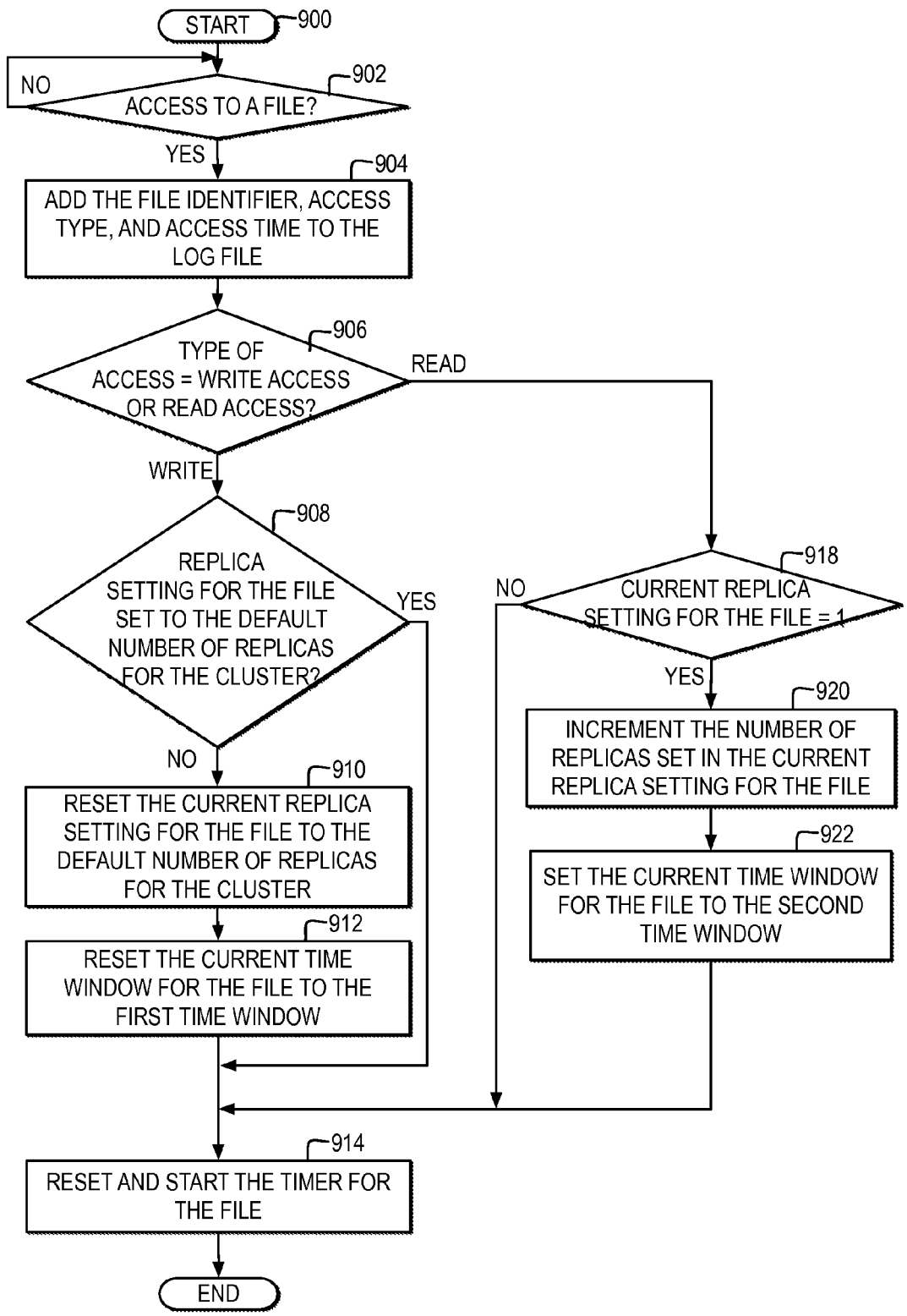
FIG. 9 is a high level logic flowchart illustrating one example of a process and program for dynamically adjusting a number of replicas of a file in response to an access to a file within a distributed file system.

FIG. 9 illustrates one example of a high level logic flowchart of a process and program for dynamically adjusting a number of replicas of a file in response to an access to a file within a distributed file system.

In the example, the process and program starts at block 900 and thereafter proceeds to block 902. Block 902 illustrates a determination whether a file is accessed. At block 902, if a file is accessed, then the process passes to block 904. Block 904 illustrates adding the file identifier for the file, a type of access, and an access time to a log file. Next, block 906 illustrates a determination whether the type of access of the file is a write access or a read access.

At block 906, if the type of access of the file is a write access, then the process passes to block 908. Block 908 illustrates a determination whether the replica setting for the file is set to the default number of replicas for the cluster. At block 908, if the replica setting for the file is not set to the default number of replicas for the cluster, then the process passes to block 910. Block 910 illustrates resetting the current replica setting for the file to the default number of replicas for the cluster. Next, block 912 illustrates setting the current time window for the file to the first time window. Thereafter, block 914 illustrates resetting and starting the timer for the file, and the process ends. Returning to block 908, at block 908, if the replica setting for the file is set to the default number of replicas for the cluster, then the process passes to block 914.

Returning to block 906, at block 906, if the type of access of the file is a read access, then the process passes to block 918. Block 918 illustrates a determination whether a current replica setting for the file is set to "1". At block 918, if the current replica setting for the file is not set to "1", then the process passes to block 914. At block 918, if the current replica setting for the file is set to "1", then the process passes to block 920. Block 920 illustrates incrementing the number of replicas set in the current replica setting for the file. Next, block 922 setting the current time window for the file to the second time window, and the process passes to block 914.

Figure 10:
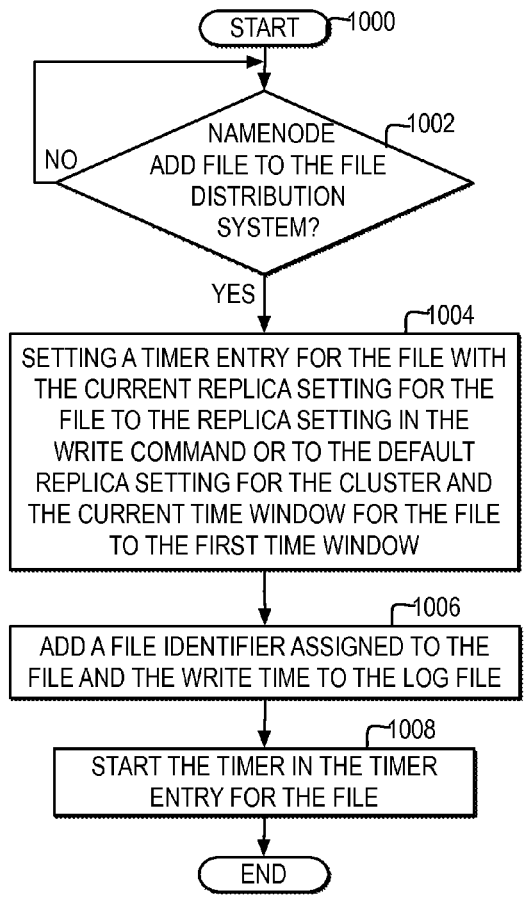
FIG. 10 is a high level logic flowchart illustrating one example of a process and program for setting a timer infrastructure for tracking accesses to a file and a number of replicas of a file when adding a file to a distributed file system.

FIG. 10 illustrates one example of a high level logic flowchart of a process and program for setting a timer infrastructure for tracking accesses to a file and a number of replicas of a file when adding a file to a distributed file system.

In the example, the process and program starts at block 1000 and thereafter proceeds to block 1002. Block 1002 illustrates a determination whether a namenode adds a file to a distributed file system. In the example, at block 1002, when a namenode adds a file to a distributed file system, then the process passes to block 1004. In the example, when a namenode adds a file to a distributed file system, the file is stored as multiple replicas across multiple racks within the distributed file system. Block 1004 illustrates setting a timer entry for the file with the current replica setting to identify the number of replicas of the file, whether set in the write command or the default replica setting for the cluster and the current time window for the file set to the first time window. Next, block 1006 illustrates adding a file identifier assigned to the file and a write time to the log file. Thereafter, block 1008 illustrates starting the timer in the timer entry for the file, and the process ends.

Figure 11:
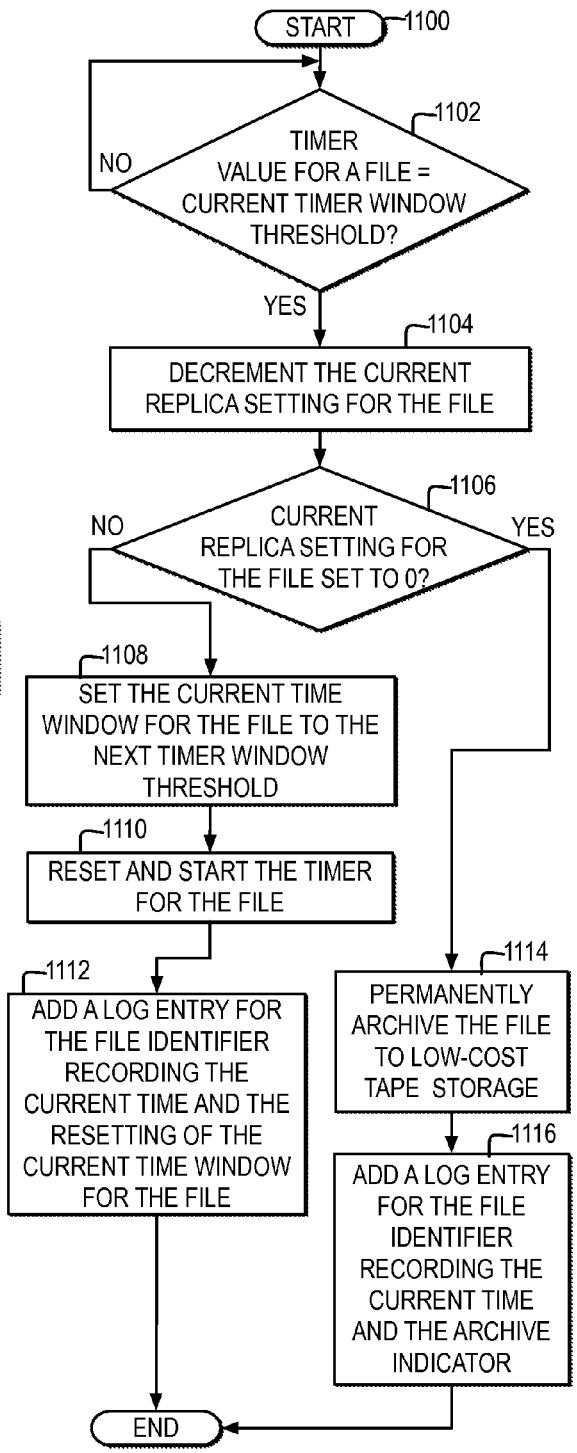
FIG. 11 is a high level logic flowchart illustrating one example of a process and program for dynamically adjusting a number of replicas of a file in a distributed file system in response to a timer counting an amount of time since a last access of the file reaching the end of a current timer window threshold.

FIG. 11 illustrates one example of a high level logic flowchart of a process and program for dynamically adjusting a number of replicas of a file in a distributed file system in response to a timer counting an amount of time since a last access of the file reaching the end of a current timer window threshold.

In the example, the process starts at block 1100 and thereafter proceeds to block 1102. Block 1102 illustrates a determination whether the timer value for a file is equal to the current timer window threshold. At block 1102, when a timer value for a file is equal to the current timer window threshold, the process passes to block 1104. Block 1104 illustrates decrementing the current replica setting value. Thereafter, block 1106 illustrates a determination whether the current replica setting for the file is set to "0". At block 1106, if the current replica setting for the file is set to "0", then the process passes to block 1108. Block 1108 illustrates setting the current time window to the next timer window threshold. Next, block 1110 illustrates resetting and starting the timer for the file, and the process ends. Returning to block 1106, if the current replica setting for the file is not set to "0", then the process passes to block 1112. Block 1112 illustrates permanently archiving the file to low-cost tape storage, and the process ends.

Figure 12:
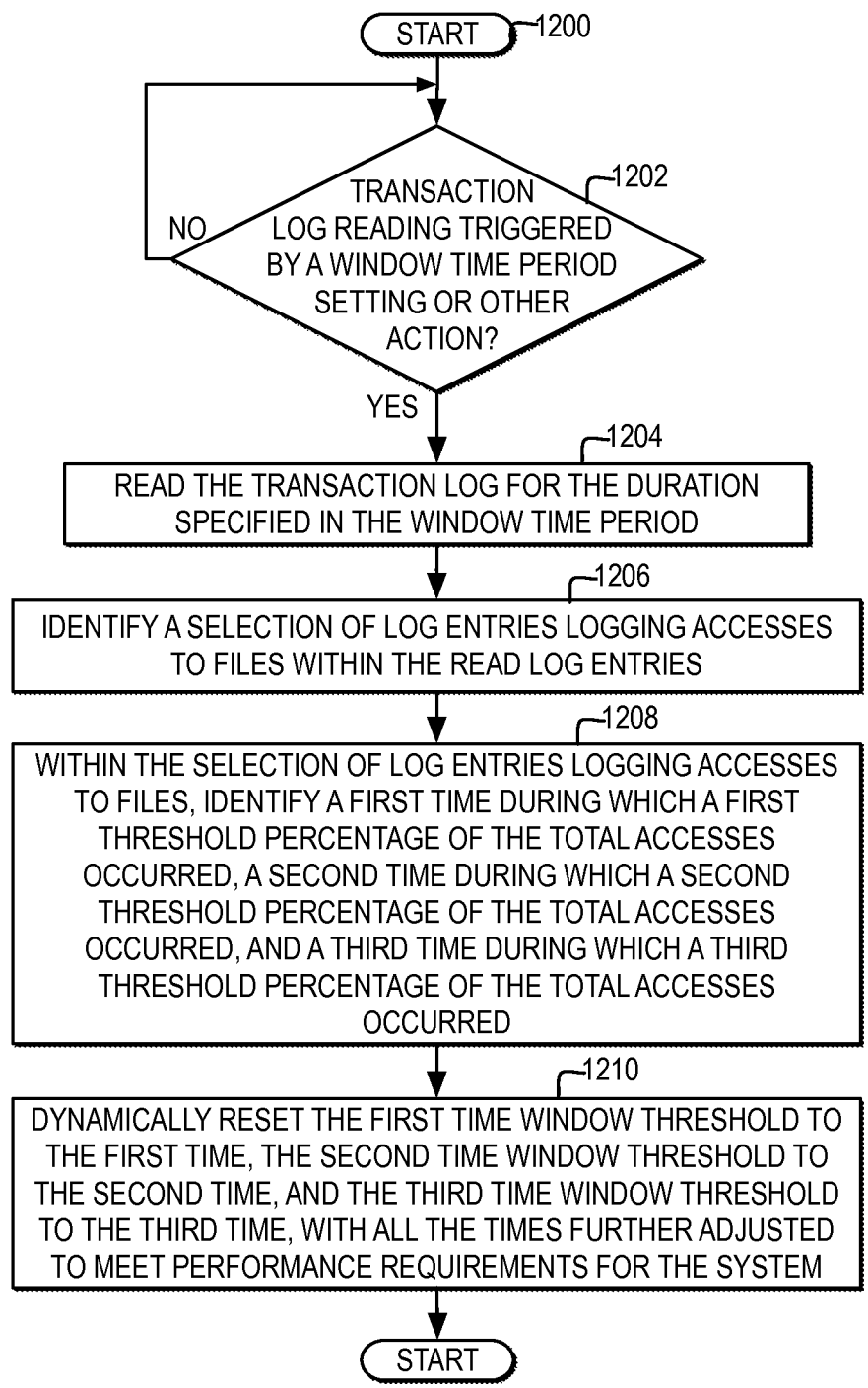
FIG. 12 is a high level logic flowchart illustrating one example of a process and program for monitoring patterns of user access to files within a distributed file system over a window analysis period and dynamically adjusting timer window thresholds and window analysis period based on the patterns of user access within the distributed file system over the window analysis period and historically, over multiple window analysis periods.

FIG. 12 illustrates one example of a high level logic flowchart of a process and program for monitoring patterns of user access to files within a distributed file system over a window analysis period and dynamically adjusting timer window thresholds and window analysis period based on the patterns of user access within the distributed file system over the window analysis period and historically, over multiple window analysis periods.

In the example, the process and program starts at block 1200 and thereafter proceeds to block 1202. Block 1202 illustrates a determination whether a transaction log reading is triggered by a window time period setting or other action. At block 1202, if a transaction log reading is triggered, then the process passes to block 1204. Block 1204 illustrates reading the transaction log for the duration specified in the window time period. Next, block 1206 illustrates identifying a selection of log entries logging accesses to files within the read log entries. Thereafter, block 1208 illustrates, within the selection of log entries logging accesses to files, identify a first time during which a first threshold percentage of the total accesses occurred, a second time during which a second threshold percentage of the total accesses occurred, and a third time during which a third threshold percentage of the total accesses occurred. Next, block 1210 illustrates dynamically resetting the first timer window threshold to the first time, the second timer window threshold to the second time, and the third timer window threshold to a third time, where each of the times is further adjusted to meet any performance requirements for the distributed file system, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for dynamically managing a number of replicas of a file in a distributed file system, comprising:
   one or more processors;
   a memory coupled to at least one of the processors;
   a set of computer program instructions stored in the memory and executed by at least one of the processors in order to perform actions of:
   in a distributed file system with a number of replicas of a file set to two or more replicas, setting a timer to track a time since a last access to the file, wherein the replicas of the file are distributed across two or more nodes within the distributed file system;
   responsive to an access to the file prior to the timer reaching a first timer window threshold, resetting the timer; and
   responsive to the timer matching a first timer window threshold, automatically reducing a number of replicas of the file within the distributed file system, wherein the probability that the file will be accessed prior to the first timer window threshold is greater than the probability that the file will be accessed after the first timer window threshold.

2. The system according to claim 1, wherein the distributed file system is a hadoop distributed file system.

3. The system according to claim 1, wherein the processors perform additional actions comprising:

responsive to the timer matching a second timer window threshold, automatically reducing the number of the replicas of the file; and responsive to the number of replicas of the file reaching a low threshold, automatically moving the file from the distributed file system to a permanent storage tape.

4. The system according to claim 1, wherein the processors perform additional actions comprising:

responsive to the timer matching the first timer window threshold, resetting the timer to count to a second timer window threshold; and responsive to receiving a write access prior to the timer reaching the second timer window threshold, increasing the number of replicas of the file and resetting the timer to count to the first timer window threshold.

5. The system according to claim 1, wherein the processors perform additional actions comprising:

responsive to the timer matching the first timer window threshold, resetting the timer to count to a second timer window threshold;

responsive to the timer matching the second timer window threshold, resetting the timer to count to a third timer window threshold; and responsive to receiving a write access prior to the timer reaching the third timer window threshold, increasing the number of replicas of the file by two and resetting the timer to count to the first timer window threshold.

6. The system according to claim 1, wherein the processors perform additional actions comprising:

responsive to the timer matching the first timer window threshold, resetting the timer to count to a second timer window threshold;

responsive to the timer matching the second timer window threshold, resetting the timer to count to a third timer window threshold; and responsive to receiving a read access prior to the timer reaching the third timer window threshold, increasing the number of replicas of the file and resetting the timer to count to the second timer window threshold.

7. The system according to claim 1, wherein the processors perform additional actions comprising:

reading a plurality of log entries for each of a plurality of accesses to a plurality of files within the distributed file system over a window time period;

identifying a first time by which a first threshold percentage of the log entries identifying accesses to the plurality of files occur; and setting the first timer window threshold to the first time.

8. A computer program product for dynamically managing a number of replicas of a file in a distributed file system, the computer program product comprising a non-transitory computer readable storage medium having program code embodied therewith, the program code executable by a computer system to:

in a distributed file system with a number of replicas of a file set to two or more replicas, set, by the computer system, a timer to track a time since a last access to the file, wherein the replicas of the file are distributed across two or more nodes within the distributed file system;

responsive to an access to the file prior to the timer reaching a first timer window threshold, reset, by the computer system, the timer; and responsive to the timer matching a first timer window threshold, automatically reduce, by the computer system, a number of replicas of the file within the distributed file system, wherein the probability that the file will be accessed prior to the first timer window threshold is greater than the probability that the file will be accessed after the first timer window threshold.

9. The computer program product according to claim 8, further comprising the program code executable by the computer system to:

responsive to the timer matching a second timer window threshold, automatically reduce, by the computer system, the number of the replicas of the file; and responsive to the number of replicas of the file reaching a low threshold, automatically move, by the computer system, the file from the distributed file system to a permanent storage tape.

10. The computer program product according to claim 8, further comprising the program code executable by the computer system to:

responsive to the timer matching the first timer window threshold, reset, by the computer system, the timer to count to a second timer window threshold; and responsive to receiving a write access prior to the timer reaching the second timer window threshold, increase, by the computer system, the number of replicas of the file and resetting the timer to count to the first timer window threshold.

11. The computer program product according to claim 8, further comprising the program code executable by the computer system to:

responsive to the timer matching the first timer window threshold, reset, by the computer system, the timer to count to a second timer window threshold;

responsive to the timer matching the second timer window threshold, reset, by the computer system, the timer to count to a third timer window threshold; and responsive to receiving a write access prior to the timer reaching the third timer window threshold, increase, by the computer system, the number of replicas of the file by two and resetting the timer to count to the first timer window threshold.

12. The computer program product according to claim 8, further comprising the program code executable by the computer system to:

responsive to the timer matching the first timer window threshold, reset, by the computer system, the timer to count to a second timer window threshold;

responsive to the timer matching the second timer window threshold, reset, by the computer system, the timer to count to a third timer window threshold; and responsive to receiving a read access prior to the timer reaching the third timer window threshold, increase, by the computer system, the number of replicas of the file and resetting the timer to count to the second timer window threshold.

13. The computer program product according to claim 8, further comprising the program code executable by the computer system to:

read, by the computer system, a plurality of log entries for each of a plurality of accesses to a plurality of files within the distributed file system over a window time period;

identify, by the computer system, a first time by which a first threshold percentage of the log entries identifying accesses to the plurality of files occur; and set, by the computer system, the first timer window threshold to the first time.

* * * * *